United States Patent [19]

Arifian et al.

[11] Patent Number: 4,594,537
[45] Date of Patent: Jun. 10, 1986

[54] REDUNDANT CONTROL SYSTEM FOR X-WING VALVE ACTUATORS

[75] Inventors: Kenneth C. Arifian, Monroe; Joseph P. Skonieczny, Madison, both of Conn.

[73] Assignee: United Technologies Corporation, Hartford, Conn.

[21] Appl. No.: 566,004

[22] Filed: Dec. 27, 1983

[51] Int. Cl.$^4$ .............................................. G05B 9/03
[52] U.S. Cl. ..................... 318/564; 318/565; 318/632
[58] Field of Search ............... 318/564, 563, 632, 565; 371/68; 364/184, 185, 200, 900

[56] References Cited

U.S. PATENT DOCUMENTS 3,408,024 10/1968 Iverson ............................. 318/564 X
3,422,327 1/1969 McBrayer ........................ 318/564 X
4,304,375 12/1981 Builta .................................. 318/564

Primary Examiner—William M. Shoop, Jr.
Assistant Examiner—Patrick C. Keane
Attorney, Agent, or Firm—Gerald E. Linden

[57] ABSTRACT

The capability of compensating automatically for a failure in an actuator and the associated drive circuit is enhanced by providing a dual channel actuator, each channel having a drive coil and a position sensor tracking the position of the actuator output shaft. A separate circuit is provided for each actuator channel to detect drive loop failures and hydraulic failures. When the drive loop of one channel fails, it is disengaged, and the gain in the remaining drive loop is doubled to maintain authority. In an embodiment, the remaining drive loop cannot disengage when certain criteria, relating to the failure of associated actuators, are met. The invention is particularly useful for aerospace applications.

1 Claim, 1 Drawing Figure

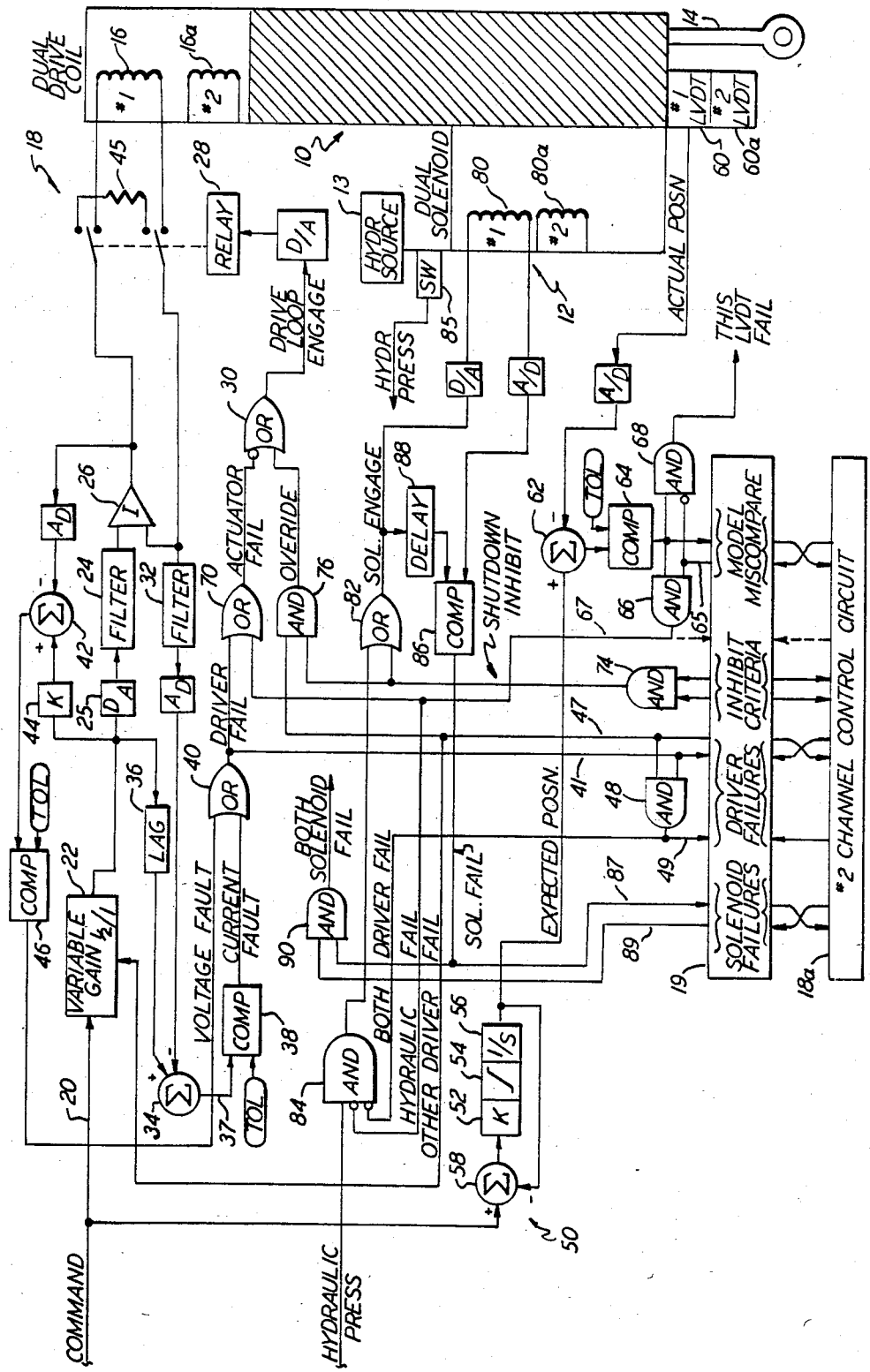

REDUNDANT CONTROL SYSTEM FOR X-WING VALVE ACTUATORS

The government has rights in this invention under contract No. NAS2-11058 awarded by NASA.

CROSS REFERENCE

Cross reference is made herein to commonly-owned U.S. application No. 559995 entitled PNEUMATIC VALVE CONTROL FOR CIRCULATION CONTROL AIRCRAFT and filed on Dec. 9, 1983 by Jeffery, et al., and commonly-owned U.S application No. 565,668 entitled PNEUMATIC CONTROL VALVE ACTUATOR COMPUTER CONTROL ARRANGEMENT and filed on even date herewith by Johnson, et al.

TECHNICAL FIELD

This invention relates to redundant control and, more particularly, to a circuit for use in conjunction with a dual actuator.

BACKGROUND ART

Fault tolerance is the object of prolonged endeavor in aircraft design. A high degree of fault tolerance can be achieved by providing for redundancy in controlled devices, as well as in the associated control circuits. Many failure modes may be detected by monitoring various signals. Knowing what to monitor and when to shutdown a particular control channel is a key concern. This is especially poignant in the context of aircraft design wherein nondetection of a failure and/or nuisance failures can cause a rapid deterioration in handling characteristics. Weight, space and cost considerations favor increasing fault tolerance through the use of more electronics rather than more mechanical hardware.

DISCLOSURE OF INVENTION

Therefore, it is an object of this invention to provide for maximum fault tolerance with minimum complexity and a minimum amount of hardware.

According to the invention, a hydraulic actuator has two channels; each is responsive to commands from a signal processor. The actuator input is dual drive coils and dual LVDT's track actuator motion. A control circuit is associated with each channel and monitors the operation of the actuator. For each channel the command is provided in a drive loop which is monitored to detect driver failures. Hydraulic failures are detected by comparing the LVDT outputs (actual position) against a model (expected position) that tracks the command. When both models miscompare a hydraulic failure signal is provided. The drive loop is disengaged when either a driver failure or a hydraulic failure is detected, indicating an actuator failure, except as follows. A shutdown inhibit signal is provided when certain extraneous criteria are satisfied for which it would be undesirable to disengage the drive loop. For instance, in the context of X-wing plenum valve control, it is undesirable to lose a valve if both adjacent valves are inoperative. Therefore, when one channel has a driver failure, and the shutdown inhibit criteria are satisfied, an override signal maintains the drive loop of the other channel engaged despite an actuator failure. A dual solenoid is provided, one per channel, and either solenoid will turn the actuator on in response to a solenoid engage signal. The solenoid engage signal is provided so long as both drivers have not failed and there is not a hydraulic failure signal. Hence, either both solenoids are commanded to engage, or neither—it serves no useful purpose to disengage a single failed solenoid. The occurrence of either a hydraulic failure or both drivers failing will therefore cause the solenoid to disengage unless the shutdown inhibit signal is provided which will cause the solenoids to engage. The actuator is therefore rendered inoperative when both drivers fail or when there is a hydraulic failure. Generally, a single solenoid failure is a harmless failure. When both solenoids fail, if they fail off, the output shaft cannot track the command, so a hydraulic failure will be indicated. In the context of X-wing plenum valve control, an inoperative actuator is bypassed and the associated valve is positioned via averaging spring linkages between the inoperative actuator and the adjacent actuators.

Other objects, features and advantages of this invention will become apparent in light of the following detailed description and accompanying drawing.

BRIEF DESCRIPTION OF DRAWING

The sole figure herein is a schematic block diagram of the invention.

BEST MODE FOR CARRYING OUT THE INVENTION

The sole figure shows a dual-channel actuator 10 that operates under hydraulic pressure from a hydraulic source 13 which is provided to the actuator 10 by a dual solenoid 12. When the solenoid 12 is off, the actuator 10 is bypassed. An output shaft (hydraulic ram) 14 is positioned in response to electrical inputs from dual drive coils 16 and 16a, but in the bypass mode the shaft 14 is passive. In the context of an X-wing aircraft, such as is described in the cross-referenced U.S. application No. 559,995, the shaft 14 is attached by a suitable linkage (not shown) to a valve in the plenum for modulating the air to the controlled circulation rotor, and in the bypass mode the "failed" valve tracks the position of the two adjacent valves through an averaging linkage.

The actuator 10 has two channels 1 and 2, and a control circuit is associated with each of the channels. For simplicity, a single control circuit 18 is described in detail in association with the channel 1. Another identical control circuit 18a is associated with the channel 2 and is shown simply by a block. References to identical elements in the other control circuit 18a carry an "a" suffix. The two control circuits 18 and 18a are interconnected by a cross channel data link 19. Each channel is responsive to a command from a signal processor (not shown) and is operable to provide one-half of full actuator authority when both channels are functioning. When only one channel is functioning, the gain in the functioning channel is doubled so that full authority is maintained. Separate signal processors may be provided for each channel, as disclosed in cross-referenced U.S. application No. 565,668.

The embodiment shown has both digital and analog hardware. The concomitant digital-analog conversion is shown by the D/A and A/D interfaces in the diagram in a straightforward manner. It should be understood that many of the functions described herein could be performed in software.

The command is provided on a line 20 to a variable gain amplifier 22. In dual operation (both channels functioning) the gain of the amplifier 22 is ONE-HALF and each channel provides half of the control. The output of the amplifier 22 is filtered by a suitable network 24 to reduce high frequency switching transients that occur in the D/A 25 and is provided to a current driver 26, the output of which is a drive signal for energizing the drive coil 16 in proportion to the command. A relay 28 is interposed in the drive loop to disconnect the coil 16 (disengage the drive loop) when the output of an OR circuit 30 is logic ZERO, indicative of a variety of failure modes which are discussed hereinafter. The drive signal is provided to the coil 16 only when the output of the OR circuit 30 is a drive loop engage signal (logic ONE). The drive signal returning from the coil 16 is filtered by a network 32 to reduce high frequency analog noise, and is provided to a summing junction 34. The summing junction 34 is also responsive to the output of the amplifier 22, as lagged by a lag circuit 36 to model the time and phase delays that occur in the drive loop, and provides a signal on a line 37, indicative of the difference between the drive signal as provided to the coil 16 and the drive signal as returned from the coil 16. When that difference exceeds a threshold (TOL), a comparator 38 provides a current fault signal (logic ONE) to an OR circuit 40, the output of which is a driver fail signal (logic ONE) on a line 41 and indicative of a driver failure in the channel 1. The faults thus detected include failure modes such as wire shorts to ground, wire opens, amplifier 26 hardovers, inoperative drive relay 28, D/A and A/D failures, etc.

Voltage in the drive loop is also monitored to detect failure modes such as the coil 16 being shorted or shorts across the wires driving the coil 16. The output of the current driver 26 is provided to a summing junction 42 that is also responsive to the output of the amplifier 22 through an amplifier 44 having a gain (K) chosen so that the output of the current driver 26 matches the scaled output of the amplifier 22. When a disparity above a threshold (TOL) occurs, a comparator 46 provides a voltage fault signal (logic ONE) to the OR circuit 40. Thus the comparator 46 Therefore, the driver fail signal is indicative of either a voltage fault or a current fault in the drive loop.

The driver fail signal typically causes the relay 28 to open, thereby disconnecting the drive coil 16. Exceptions to this case are discussed hereinafter. When the coil 16 is disconnected, the drive loop is shunted, through a resistance 45. The driver fail signal is also provided via the data link 19 to the other control circuit 18a. Similarly, the other control circuit 18a provides a driver fail signal on a line 47 to the control circuit 18. When the other control circuit 18a provides the driver failure signal on the line 47, the gain in the variable gain amplifier 22 is doubled to maintain full authority in channel 1, and vice versa. When both channels signal a driver failure, an AND circuit 48 provides a both driver fail signal (logic ONE) on a line 49. Via the data link 19, the both driver fail signal causes the signal processor to stop the calculation of the command and to compensate the adjacent actuators for this actuator's failure. This is in conjunction with the averaging linkage between adjacent valves, as disclosed in the cross-referenced U.S. application No. 559,995. As will be evident hereinafter, the both driver fail signal will also shutdown the hydraulics.

Hydraulic failures are detected by comparing the actual position of the hydraulic ram 14 against its expected position as determined by a model 50 that is responsive to the command on the line 20. The model 50 may be implemented in a number of manners, including digitally, but is simply shown as comprising an amplifier 52, a rate limiter 54, an integrator 56, and a feedback path through a summing junction 58. The output of the model 50 nominally corresponds to the output of a position sensor, such as a linear variable displacement transformer (LVDT) 60, which is indicative of the actual hydraulic ram position. Any mismatch in the two outputs is manifested as a non-ZERO difference signal by a summing junction 62 and, when the mismatch exceeds a threshold (TOL), the output of a comparator 64 is a model miscompare signal (logic ONE). The model miscompare signal is provided via the data link 19 to the other control circuit 18a and, similarly, a model miscompare is provided on a line 65 from the other control circuit 18a. When both channels signal a model miscompare, an AND circuit 66 provides a hydraulic fail signal (logic ONE) on a line 67. A flag (THIS LVDT FAIL) indicative of the failure only of the LVDT 60 associated with this channel is set by an AND circuit 68 when this channel has a model miscompare (output of the comparator 64 is logic ONE) and the other channel does not have a miscompare (logic ZERO on the line 65 to the inverting input of the AND circuit 68). The flag may be used to set a fault code for maintenance personnel to take corrective action on the LVDT 60.

An OR circuit 70 is responsive to the hydraulic fail signal and to the driver fail signal, and provides an actuator fail signal (logic ONE) based on either to the inverting input of the OR circuit 30 so that when there is neither a driver failure nor a hydraulic failure, the actuator fail signal is not provided and the drive loop engage signal (logic ONE) maintains the drive loop engaged (relay 28 closed).

When the actuator fail signal is provided, the relay 28 will open unless other conditions cause the provision of the drive loop engage signal despite the actuator fail signal. For instance, a shutdown inhibit signal (logic ONE) is provided by an AND circuit 74 when certain extraneous criteria are satisfied which would make it undesirable to disengage the drive loop. Herein, an AND circuit 76 is responsive to the driver failure signal of the other channel 18a on the line 47 and to the shutdown inhibit signal and will provide an override signal (logic ONE) to the OR circuit 30 when the shutdown inhibit signal and the other channel drive failure signal are both present thereby causing the drive loop engage signal to be provided, despite the provision of an actuator fail signal. Thus, when the inhibit criteria exist which make the disengagement of a drive loop and concomitant loss of actuator control undesirable, the drive loop of one of the channels can disengage, but the remaining drive loop cannot disengage—it having been determined that some control is preferable to no control under these conditions. In the context of X-wing aircraft control, as described in the cross-referenced U.S. application No. 565,668 the criteria for which it is not desirable to shutdown a valve may be the failure of the two adjacent valves, or two of three adjacent valves. However, the particular criteria are not germane to this invention.

The dual solenoid 12 has two solenoids 80, 80a, one associated with each channel. When either solenoid is energized, hydraulic pressure is supplied to the actuator. Loss of both solenoids is required to initiate a bypass mode. A solenoid engage signal (logic ONE) is provided by an OR circuit 82 based on either of two situations. In normal operation, the solenoid engage signal is provided in response to the output of an AND circuit 84 when a hydraulic pressure signal (logic ONE) is provided and the hydraulic failure signal and both driver fail signal are not provided. The hydraulic pressure signal is provided in response to pressure from the source 13 by a switch 85. When either the both driver fail signal or the hydraulic fail signal are provided, the output of the AND circuit 84 is logic ZERO and the solenoid engage signal is not provided by the OR circuit 82, except shutdown inhibit signal.

Solenoid failures are detected by the control circuit 18. A comparator 86 compares the solenoid engage signal that is provided to the coil 80 to a signal returned therefrom (feedback loop) and provides a solenoid fail signal (logic ONE) on a line 87 based on a lack of agreement between the two. A delay circuit 88 delays the comparison for a moment, such as 100 milliseconds after the solenoid engage signal is provided to allow for the voltage lag across the solenoid 80. Similarly, the other control circuit 18a provides a solenoid fail signal on a line 89 indicative of a fault associated with the solenoid 80a. When both channels signal a solenoid fault, an AND circuit 90 provides a both solenoid fail signal (logic ONE) to set a fault code. In response to the solenoid failure, the external processor will cause the bypass of the actuator.

Redundancy is maximized in that a hydraulic failure is not indicated unless both LVDT's disagree with their associated models, and the actuator will function with one drive coil and one solenoid, even if the coil and solenoid are not in the same channel.

The foregoing description is in simplified block form. Generally, the provision of a named signal is indicated by a logic ONE, while its nonprovision is indicated by a logic ZERO. Other than for purposes of the description, the particular logic levels are not germane to the invention and in many instances the positive logic disclosed may readily be reworked into inverting logic to be more suitably applicable to available hardware chips. The description is, therefore, principally in terms of function, and it should be understood that numerous variations may be utilized for achieving the same or equivalent functions and combinations of functions within the skill of the art.

Although the invention has been shown and described with respect to an exemplary embodiment thereof, it should be understood by those skilled in the art that the foregoing and various other changes, omissions and additions may be made therein and thereto without departing from the spirit and scope of the invention.

We claim:

1. In a control arrangement including a series of dual channel electrohydraulic actuators interconnected by averaging linkages so that when a particular actuator is "off" it passively tracks the average position of the two adjacent actuators; in each channel of each actuator, a control circuit comprising, means (20) for providing a command to the actuator indicative of a desired actuator position;

a solenoid (12) for providing hydraulic pressure to the actuator, thereby turning the actuator "on" in response to a solenoid engage signal;

comparator means (86) for providing a solenoid fail signal in response to the contemporaneous presence of the solenoid engage signal and absence of a corresponding signal indicating coil continuity;

monitor means (38,40,46) for providing a driver fail signal in response to a current or voltage condition indicative of a fault in a drive coil (16) of the actuator;

position means (60) connected to the actuator for providing an actual position signal indicative of the actuator position;

model means (52,54,56,58) for providing an expected position signal indicative of the desired actuator position in response to the command;

comparator means (64) for providing a model miscompare signal in response to a disparity between the actual position signal and the expected position signal;

logic means (66) for providing a hydraulic fail signal in response to the contemporaneous provision of the model miscompare signals from both channels;

logic means (70) for providing an actuator fail signal in response to the driver fail signal, and for providing the actuator fail signal in response to the hydraulic fail signal;

means (74) for providing an inhibit criteria signal in response to extraneous criteria which would make it undesirable to disengage the drive loop;

logic means (76) for providing an override signal in response to the contemporaneous provision of the inhibit criteria signal and the driver fail signal from the other channel;

logic means (30) for providing a drive loop engage signal in response to the nonprovision of the actuator fail signal, and for providing the drive loop signal in response to the override signal;

switch means (28) for disconnecting the drive coil from the control circuit in response to the nonprovision of the drive loop engage signal;

logic means (82,84) for providing the solenoid engage signal in response to the inhibit criteria signal, and for providing the solenoid engage signal in response to the contemporaneous nonprovision of the hydraulic fail signal and the driver fail signals from both channels; and wherein the actuator is off when the solenoid engage signals from both channels are not provided.

* * * * *